United States Patent [19]
Otto

[11] Patent Number: 5,703,943
[45] Date of Patent: Dec. 30, 1997

[54] COMPLETION OF CALLS TO A PREFERRED AGENT IN AN AUTOMATIC CALL DISTRIBUTOR

[75] Inventor: Mary Rita Otto, Lisle, Ill.

[73] Assignee: Lucent Technologies, Inc., Murray Hill, N.J.

[21] Appl. No.: 543,539

[22] Filed: Oct. 16, 1995

[51] Int. Cl.[6] .................... H04M 3/00; H04M 15/00; H04M 3/42
[52] U.S. Cl. .................... 379/265; 379/127; 379/209; 379/309
[58] Field of Search .................... 379/127, 142, 379/201, 207, 210, 211, 212, 214, 265, 266, 309, 67, 88, 89, 209

[56] References Cited

U.S. PATENT DOCUMENTS

| | | | |
|---|---|---|---|
| 5,020,095 | 5/1991 | Morganstein et al. | 379/266 X |
| 5,036,535 | 7/1991 | Gechter et al. | 379/210 |
| 5,062,103 | 10/1991 | Davidson et al. | 379/265 X |
| 5,206,903 | 4/1993 | Kohler et al. | 379/265 X |
| 5,268,958 | 12/1993 | Nakano | 379/265 X |
| 5,392,345 | 2/1995 | Otto | 379/265 |
| 5,537,470 | 7/1996 | Lee | 379/266 |

OTHER PUBLICATIONS

AT&T Network Systems Brochure 235-300-070: 5ESS® Switch ACD/MIS, Issue 2, Aug. 1990, pp. 11-19.

*Primary Examiner*—Harry S. Hong
*Attorney, Agent, or Firm*—Werner Ulrich

[57] ABSTRACT

This invention relates to methods and apparatus for completing calls to selected agents of an ACD (Automatic Call Distributor). In accordance with this invention, callers to the ACD are frequently assigned a preferred agent for handling their transactions. When these callers call the basic number of the ACD, they are identified and routed preferably, to the preferred agent if that agent is logged on. If the callers have not completed a transaction, the agent who is serving a call for that transaction provides a transaction number to the caller and the caller subsequently is connected to the agent associated with that transaction number. Advantageously, callers can normally be served by the same agent while still having the advantage of having their calls queued to any available agent of the ACD if the preferred agent for handling a caller or handling a transaction is not available.

5 Claims, 8 Drawing Sheets

| TRANSACTION NO. | ANI | NO. OF CALLS | PREFERRED AGENT ID | TEAM ID |
|---|---|---|---|---|
| | | · | | |
| | | · | | |
| | | · | | |
| | | | | |

| ANI | NO. OF CALLS | PREFERRED AGENT ID | TEAM ID |
|---|---|---|---|
| | | | |
| | | ⋮ | |
| | | | |

*FIG. 2*

| TRANSACTION NO. | ANI | NO. OF CALLS | PREFERRED AGENT ID | TEAM ID |
|---|---|---|---|---|
| | | | | |
| | | ⋮ | | |
| | | | | |

*FIG. 3*

COMPLETION OF CALLS TO A PREFERRED AGENT IN AN AUTOMATIC CALL DISTRIBUTOR

TECHNICAL FIELD

This invention relates to automatic call distributors and, specifically, to the selection of agents for a call to an automatic call distributor.

PROBLEM

Automatic call distributors (ACDs) are used by large businesses to accept incoming calls and to route such calls to agents for communicating with a calling customer. A typical example of an automatic call distributor (ACD) is the system used by airlines to accept calls requesting reservations and tickets. The agents are grouped into teams and any call of a particular type from a particular area of the country is routed to one of these teams by a routing scheme that is sufficiently flexible to select alternate teams according to the time of day, day of week and amount of traffic to the preferred team. The use of agent teams permits an efficient utilization of agents; queues for agent teams allow the agent teams to be used close to capacity. ACDs take measurements to keep track of the performance of individual agents, and to keep track of the level of traffic load, so that a supervisor can add or subtract agents or prepare to order additional agent positions.

While this arrangement is very successful in handling large numbers of calls, it tends to lose the personal touch provided by contact with a favored agent with whom a particular caller has had frequent contact. While agents frequently have a private telephone number for bypassing the ACD, use of this number for business purposes is discouraged, because no queuing is possible for completing a call to other agents, and because use of this number distorts the measurements for the ACD, since calls to the personal number are usually for personal business. Further, if a particular transaction is not completed during the first call— for example, if the caller has temporarily mislaid his/her credit card, —the second call required to complete the transaction is usually handled by a different agent. This creates a less than perfect customer interface and creates problems if the agents are working on commission. A problem of a prior art, therefore, is that there is no satisfactory arrangement for coupling particular callers to particular agents of an ACD by that same agent.

SOLUTIONS

The above problem is solved and an advance is made over the prior art, in accordance with the principles of applicant's invention, wherein a record is maintained of the preferred agent for a particular caller (as identified by that caller's telephone number provided through automatic number identification (ANI), and calls from that telephone number are routed to a preferred agent whenever possible. In accordance with another feature of applicant's invention, if a transaction is not completed on a first call, the caller is provided with a transaction number and a second call for this transaction is then completed to the same agent after the caller has provided the transaction number.

In accordance with another feature of applicant's invention, if the preferred agent is not available, the conventional arrangements of an ACD are used to connect the caller to alternate agents of the ACD, preferably those of the same team or of a preferred team for serving the caller. Advantageously, the facilities of the ACD are used to connect callers to a preferred whenever possible, and to connect the callers to alternate agents when the preferred agent is not available. Advantageously, this is accomplished without distorting the measurements of the ACD, which are useful for administering the operations of that ACD. Queuing is possible for the second call without distorting the normal operation of the ACD and, therefore, without giving customers false preferences or allowing callers to circumvent the queuing system of the ACD.

In accordance with one specific embodiment, callers are offered the choice of leaving a message in case the preferred agent is not available. Advantageously, this provides the caller with the option of leaving a message in order to communicate at a later time with the preferred agent for a more complex transaction while allowing the caller to use other agents for the more straightforward transactions.

In accordance with one specific embodiment, the calls for incomplete transactions, in which the callers have been provided with a transaction number, are routed via the different telephone number. Advantageously, this identifies such calls so that the callers can be immediately prompted to provide the transaction number.

BRIEF DESCRIPTION OF THE DRAWING

FIGS. 2 and 3 illustrate layouts of memory used for implementing the invention.

DETAILED DESCRIPTION

Figure 1:
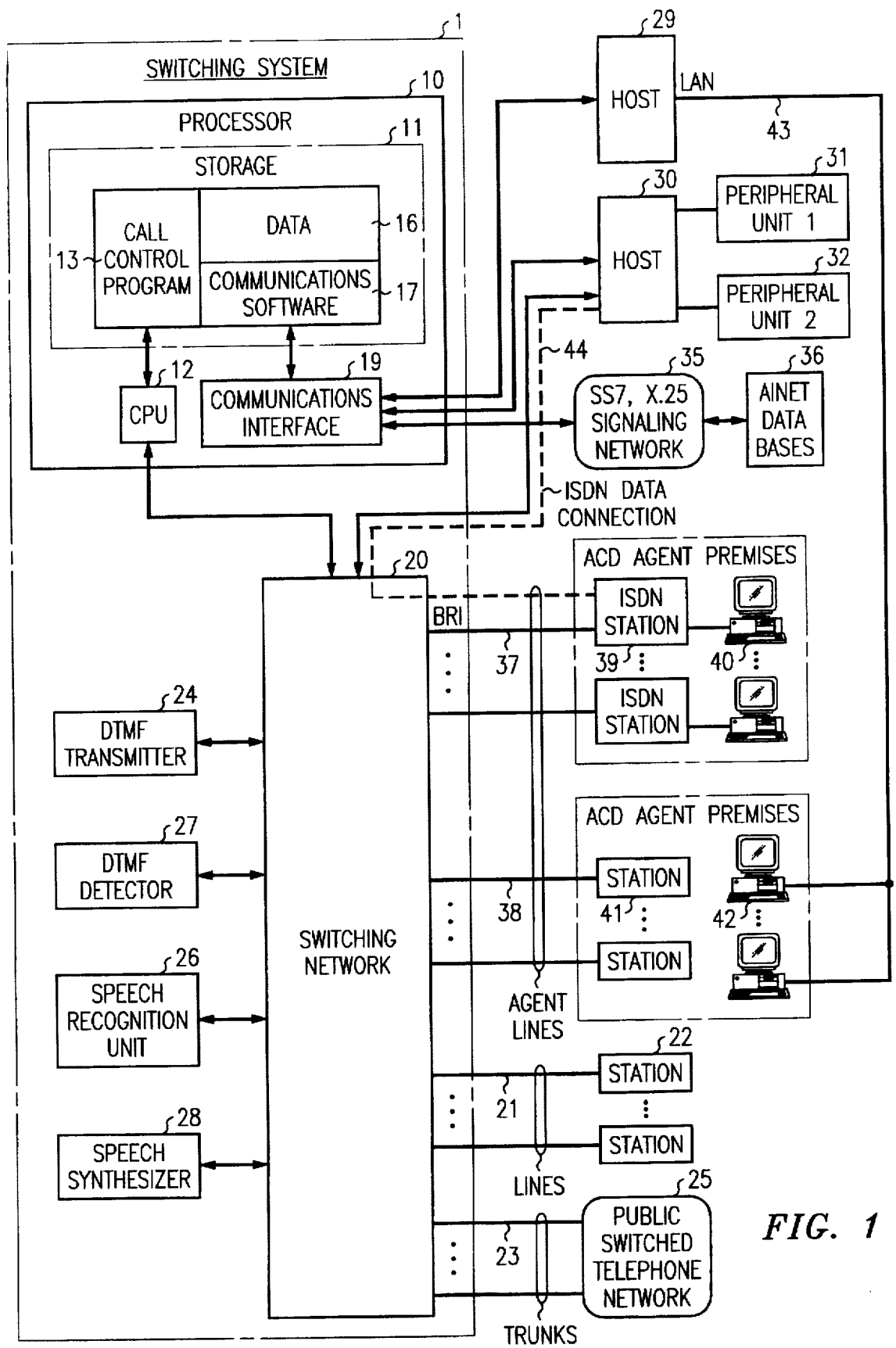
FIG. 1 is a block diagram illustrating the operation of applicant's invention.

FIG. 1 is a block diagram illustrating the operation of applicant's invention. Switching system 1 is connected by a plurality of trunks 23 to the public-switched telephone network 25. Also connected to switching system 1 are a plurality of stations 22 connected via lines 21. In addition, agent stations, such as 39 and 41 automatic call distributor, are connected to the switching network 20 by lines 37, ..., 38, and are used by agents of the automatic call distributor. The stations may be connected to each other through switching system 20 of switching system 1 or may be connected to callers not served by switching system 1 via trunks connected to the public-switched telephone network.

Agent station 39 is an ISDN (Integrated Services Digital Network) station which communicates with switching network fabric 20 (referred to as switching network in FIG. 1 and the claims) over an ISDN line 37 that carries two B-channels and one D-channel. The station 39 is connected to a PC (personal computer 40 by an RS 232 channel. In the preferred embodiment, the PC 40 communicates with a host system 30 over a switched circuit data connection utilizing a B-channel or a D-channel that is switched in switching network 20. Station 41 is a conventional analog telephone system; the agent at that station has a PC 42 which communicates with host system 29 via an LAN (local area network) connection 43.

In applicant's preferred embodiment, switching system 1 includes software in a call-control program 13 for serving an automatic call distributor (ACD). An example of such a system is AT&T's 5ESS® switch equipped with the PINNACLE® software, both provided by AT&T Network Systems. The PINNACLE® application of the 5ESS is associated with a centrex application of the 5ESS switch. The centrex application allows each line of a business to be called directly from the outside by having each such line provided with a telephone number. At the same time, when these lines are part of an automatic call distributor, calls for the main numbers of the automatic call distributor can be distributed to the individual lines of the centrex.

Agents are grouped into one or more teams and calls to an ACD are completed to any available member of a selected team. Switching system 1 includes a processor 10 having storage 11, which storage includes both long-term storage, describing the features available to particular customers and the line which is associated with each telephone number, as well as transient data recording the present state of all calls in the system, and the communication software for controlling communications between the processor and outside units such as the signaling network 35 and the host processors 29 and 30. Signaling network 35 is used for carrying signaling system 7 (SST) signaling messages and X.25 data packets for communicating with the data bases 36 of an Advanced Intelligent Network. Alternatively, a Local Are Network can be used for accessing an internal or external data base; an example is LAN 43.

Host computer 30 is shown as having two peripheral units, 31 and 32, for storage or data communication purposes. The host computers interface with communications interface 19, using a standard protocol such as TCP/IP. The host computers are administered by individual customers and contain data supplied by these customers. This is in contrast to the data in data block 16 of storage 11 which is under the control of and/or supplied by the telephone administration operating switch 1.

Data in block 16 or stored in blocks 29 or 30 contain information about the characteristics of individual agent stations which are connected to the switching system 1. Stored in the memory of processor 11 are two tables, table 50 (FIG. 2) and table 60 (FIG. 3). Each entry of table 50 is used to relate a caller's telephone number, usually supplied via automatic number identification (ANI), and called, for convenience, the caller's ANI (block 52), counter for the number of calls from that ANI (block 53), an identification of the preferred agent for handling calls from that ANI (block 54), and an indication of the preferred team for handling calls from that ANI when the preferred agent is not available (block 55). In some implementations, the identity of the preferred team is inherently implied by the agent identity and need not be explicitly recorded. Agents are normally assigned to teams. Table 50 comprises a plurality of entries such as entry 51 (containing blocks 52, 53, 54, and 55), each entry being for one ANI. Additional data can be included in this table, such as the client's name or account number, credit information, or any other data useful for serving this customer. For each ACD directory number, a separate table 50 and, where appropriate, a separate table 60 is provided.

Table 60 comprises a plurality of entries such as entry 61, which includes data blocks 62,63,64,65 and 66. Block 62 contains a transaction number for recording the number of a transaction when that transaction has not been completed after an initial call. Block 63 is used to record the ANI for that transaction number. Block 64 is used to record the number of calls that have been made with respect to that transaction number. Block 65 contains an identification of the preferred agent for sending that transaction. Block 66 contains an identification of a preferred team if the preferred agent is not available. In general, the preferred team is a team of which the preferred agent is a member. More generally, the preferred team indicator may include a sequence of agent teams and/or routing to a voice message system or a paging system is indicated in the preferred team field.

Figure 4A:
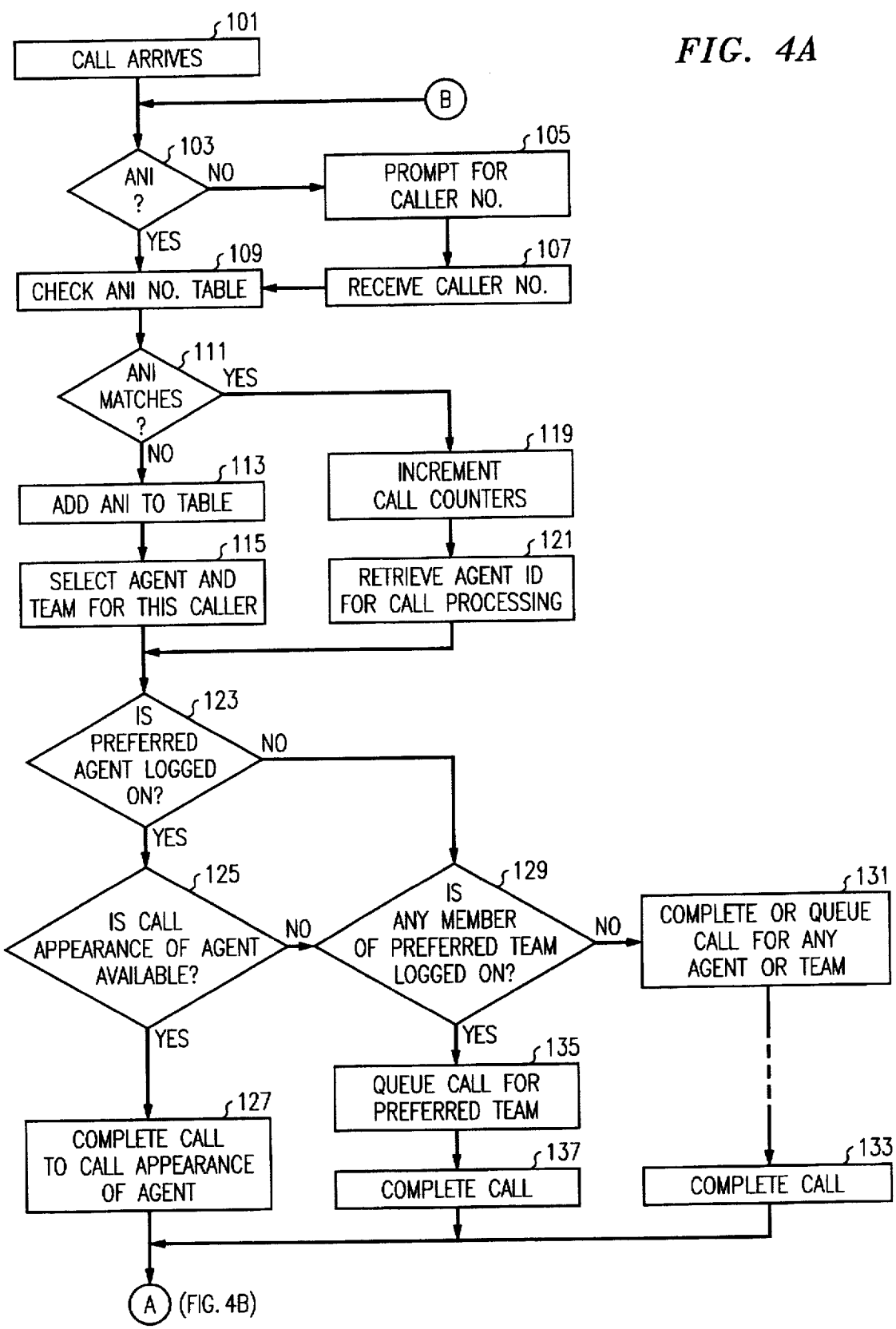
FIGS. 4A, 4B, 5A, 5B, 5C and 6 are flow charts of programs used for implementing applicant's invention.
Figure 4B:
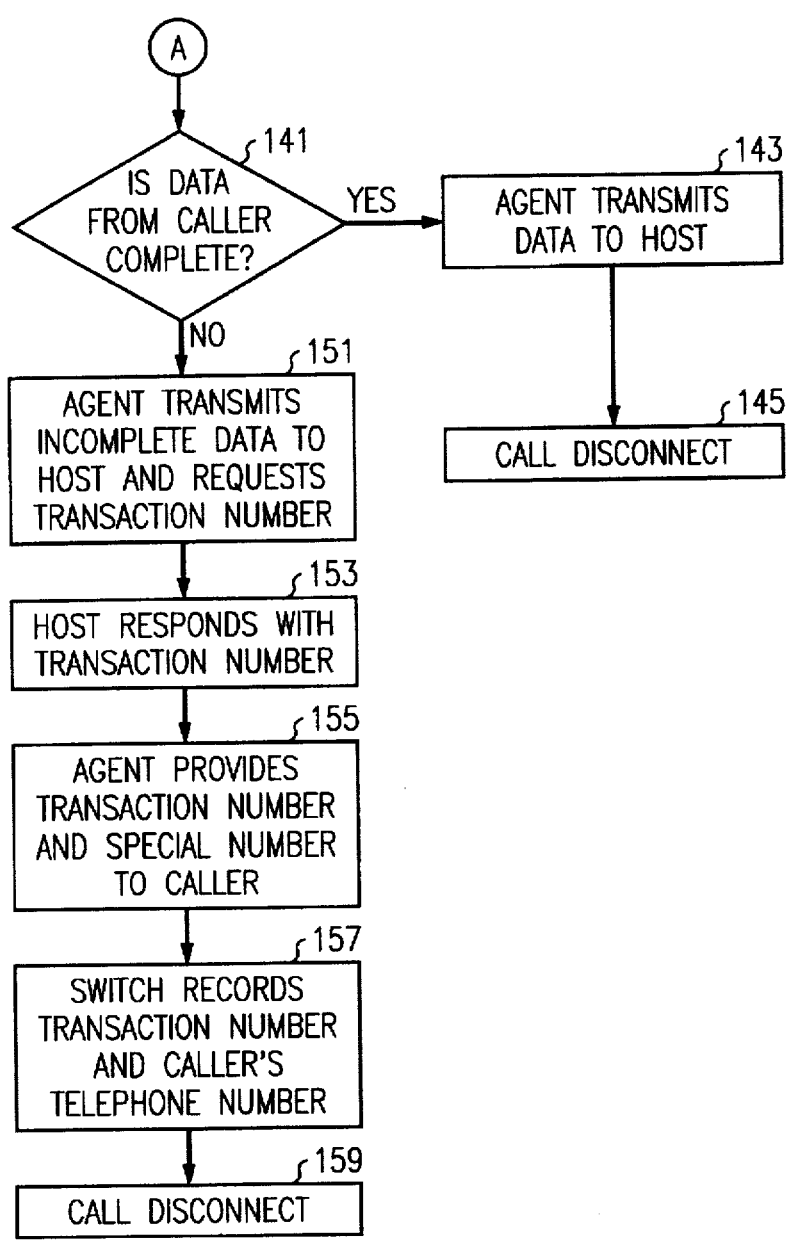

FIG.4 is block diagram illustrating the processing of a call to an automatic call distributor in accordance with the principles of applicant's invention. The call arrives (action block 101). Test 103 is used to determine whether the caller's number has been provided by ANI. If not, the caller is prompted to key in the caller's telephone number (action block 105) and the caller responds by keying in that telephone number which is received by the switch (action block 107). This keyed-in number is treated thereafter in the same way as the ANI. If the ANI has been provided or if the caller has keyed in a number which is subsequently treated as if it were the ANI, the ANI number table (table 50) is checked (action block 109). Alternatively or additionally, the caller can speak a number for recognition by a speech recognition system.

Test 111 is used to determine if the ANI matches any entry in table 50. If not, the ANI is added to the table (action block 113). The ACD automically assigns (action block 115) a preferred agent and team based on the geographic location of the caller as identified from the caller's number received by the ACD. In order to distribute work equitably among agents, table 50 is consulted to determine the load for each agent before selecting an agent of a team for the new call. Agents can also be selected on the basis of such factors as language capability and other specialized skills. An entry is made in table 50 and the call proceeds according to test 123 and the subsequent actions. If the result of test 111 is that the ANI is found in table 50, then the call counter for that ANI is incremented (action block 119) and the preferred agent ID is retrieved for subsequent processing (action block 121).

Subsequently, test 123 is performed following either blocks 117 or 121. Test 123 is used to determine whether the preferred agent is logged on. If so, test 125 is used to determine if a call appearance of that agent is available. Note that, in order to take advantage of applicant's invention, it is desirable that the agents each have several call appearances so that they may work on several calls simultaneously; this allows an agent to complete one transaction while putting one or more other calls on hold.

If a call appearance is available, then the call is completed to such an available call appearance of the preferred agent (action block 127). If the preferred agent is not logged on, or no call appearance is available, then test 129 is used to determine whether any member of the preferred team is logged on. If not, then action block 131 is used to queue the call for any agent or team. Subsequently, such a call is completed (action block 133). If any member of the preferred team is logged on, then the call is queued for the preferred team (action block 135) and the call is eventually completed (action block 137). Note that action blocks 135 and 137 can also be entered if the preferred agent is logged on, but has no available call appearance (negative result of test 125).

Following any of the blocks 127, 133 or 137, the agent communicates orally with the caller in order to accumulate data for a transaction and at the end of the communication, test 141 is used to determine whether the data from the caller is complete for the transaction. If so, then the agent transmits the complete transaction data to the host for that ACD (action block 143) over a D-channel or B-channel connection of the agent's station; in the pre-formed embodiment, this is done over a circuit-switched data channel. The call is then disconnected (action block 145). If the data from the caller is not complete, the agent transmits incomplete data to the host and requests a transaction number (action block 151). The host responds with a transaction number (action block 153). The agent provides a transaction number and a special telephone number to the caller (action block 155). This special telephone number is used for making second and subsequent calls when a transaction number has been assigned, and as will be seen with respect to FIG. 5, the calling of this special number leads to an immediate prompt requesting the transaction number. The switch records the transaction number, the caller's telephone number, the agent's identification and the preferred team identification in a new entry in table 60 (action block 157). The call is then disconnected (action block 159). In this way, the transaction number limits the access of callers to preferred service to only those cases when a transaction is in progress.

In present day switching systems, communications between the host data base and the switch can be performed in one of two ways: either the host can directly communicate with the switch and cause an entry in table 60 to be inserted by the switch, or the host communicates only with the agent, and the agent then communicates with the switch in order to create the entry in the table.

Figure 5A:
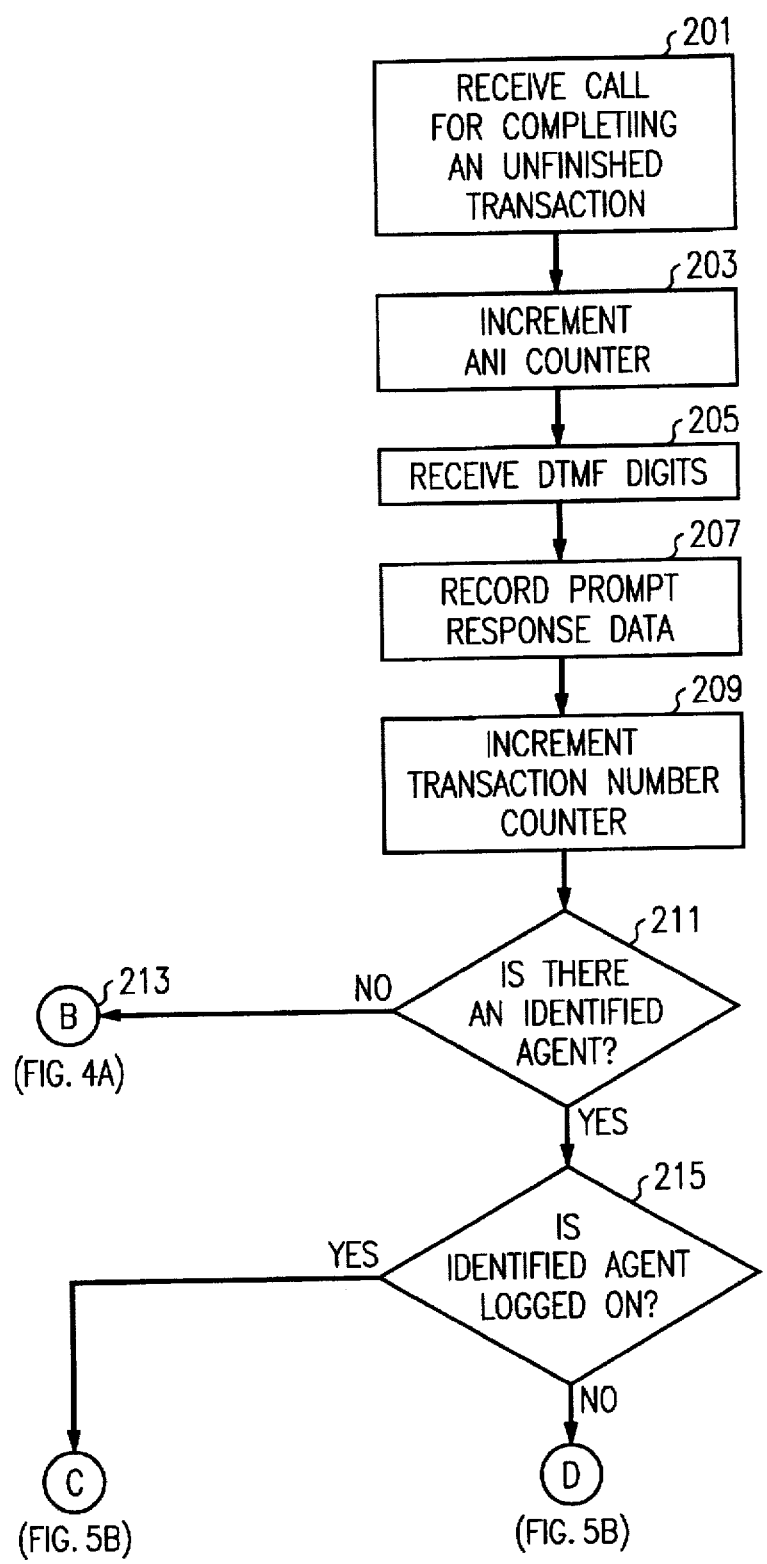
Figure 5B:
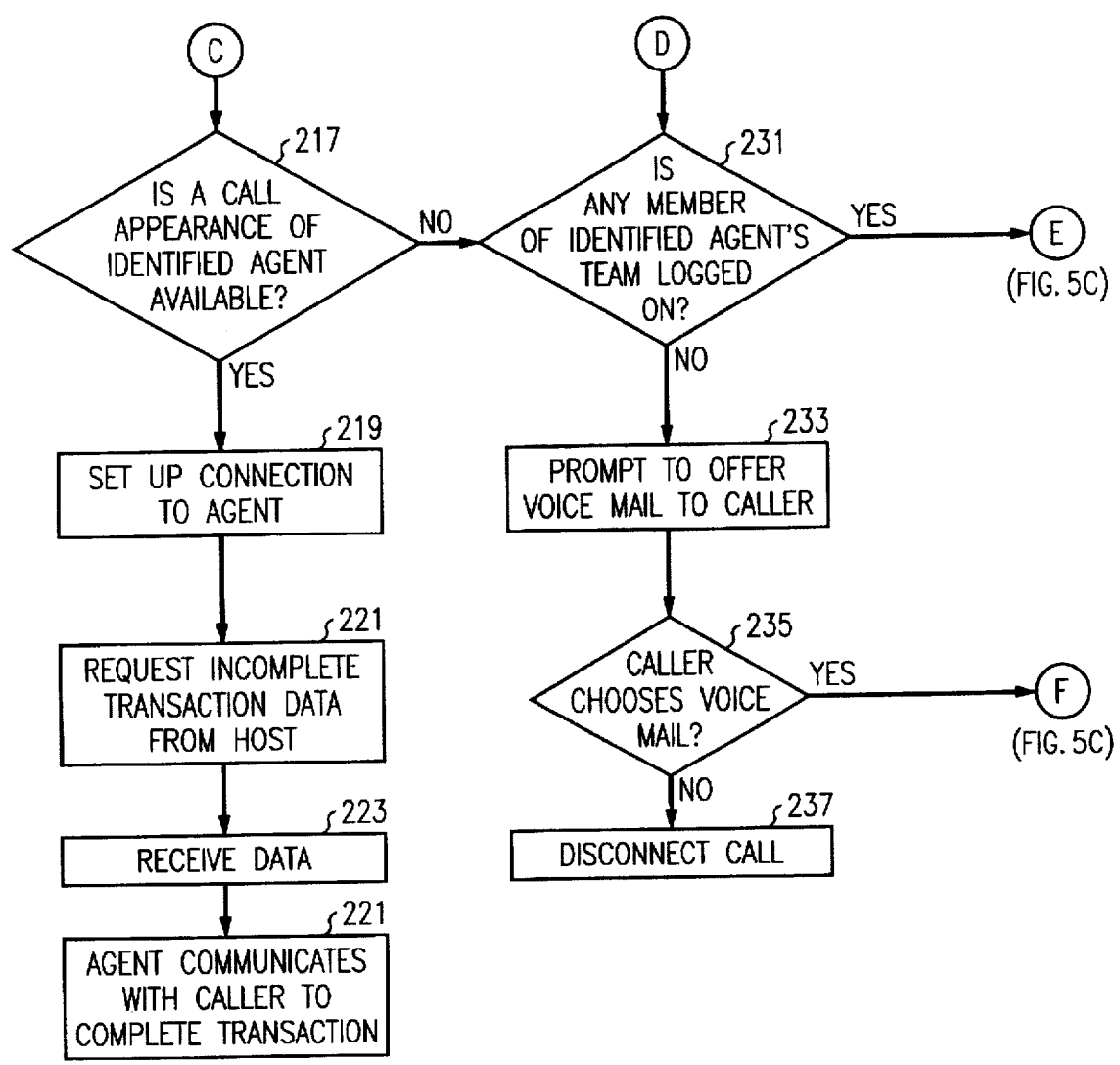
Figure 5C:
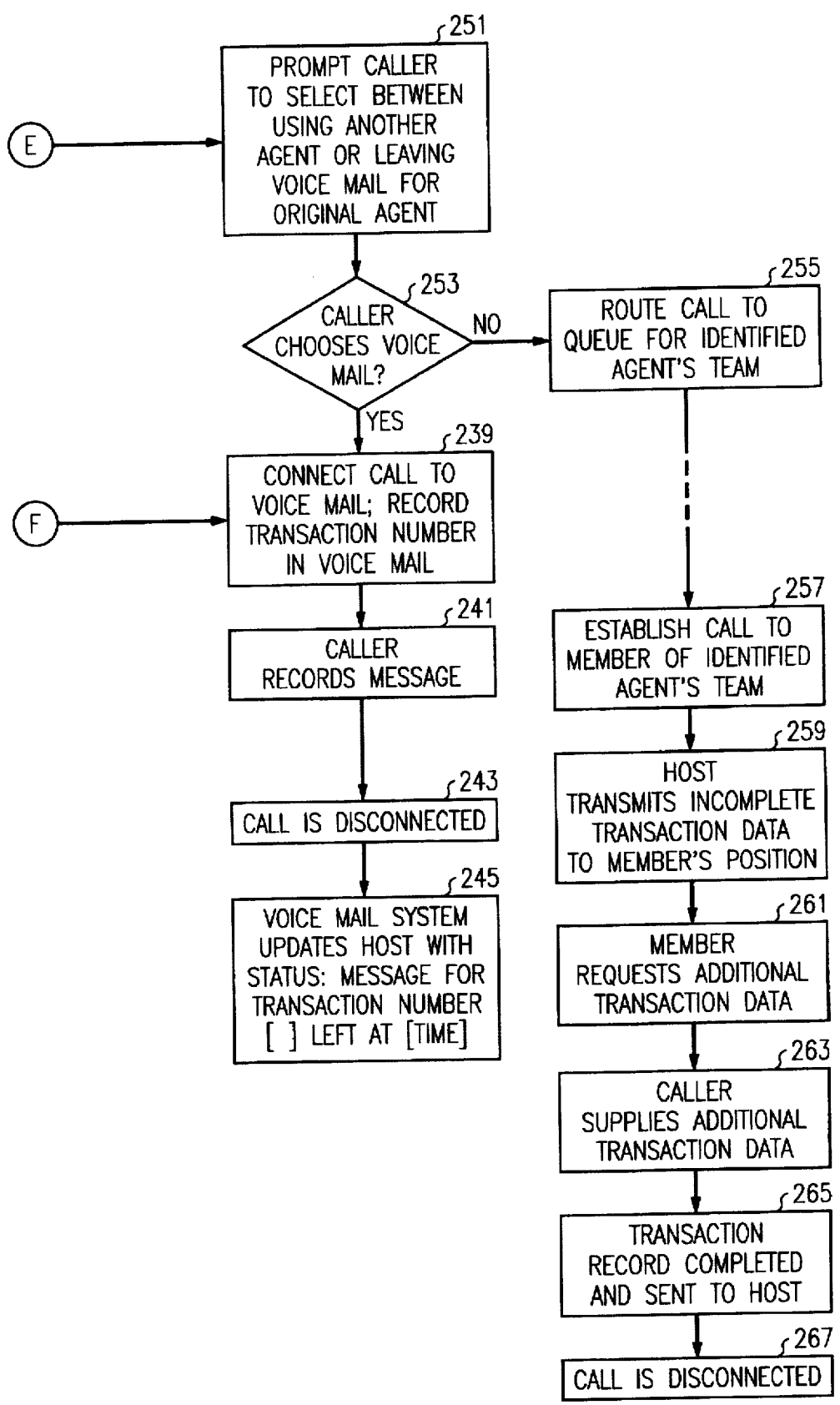

FIG. 5 illustrates call processing for a call, completing a transaction that has previously been started. According to principles of applicant,s invention, a different telephone number is used for calls to the ACD if the call is to complete a previously started transaction. The use of a different telephone number allows such calls to be immediately recognized (action block 201). The caller receives a prompt for the transaction number (action block 202). If the customer prefers to avoid the use of a special number, an equivalent effect can be accomplished by appending the message: "Or key in a transaction number followed by a pound sign" to the initial prompt so that a transaction numbers can be requested an recognized, or by instructing the caller to key in the transaction number as soon as the first prompt (unrelated to transaction numbers) is heard; the special characteristic of the use of a separate telephone number is that a different treatment is used to start the process of serving the caller. The counter for the caller's ANI is incremented in table 50 (action block 203). If the caller's ANI does not appear in table 50, the call is treated as if it were a new call (action block 115 and subsequent steps); this prevents someone from falsely receiving preferred treatment. (If no ANI has been received for that call, then the ANI can subsequently be identified on the basis of the transaction number received from the caller and the counter can be incremented when the ANI is so recognized). The caller keys dual tone multifrequency (DTMF), digits representing the transaction number, which digits are received (action block 205). This response data is recorded in the switch (action block 207) and the counter for that transaction number is incremented in table 60 (action block 209). Test 211 is used to determine if there is an identified agent for this transaction number. If not, then the call is completed to any agent and the call is treated in essentially the same way as if it were a first call received, by transferring directly to test 103 of FIG. 4 and following the sequence of actions from that point on.

If there is an identified agent, then test 215 is used to determine whether the identified agent is logged on. If so, then test 217 is used to determine if a call appearance of the identified agent is available. If so, a connection is set up to the call appearance of that agent (action block 219). The agent requests the host to provide the in-progress transaction data (action block 221). The agent receives this data (action block 223) and the agent communicates with the caller to complete the transaction (action block 225).

If the identified agent is not logged on(negative result of test 215), or there is no call appearance for the identified agent available (negative result of test 217), then test 231 is used to determine if any member of the identified agent's team is logged on. If not, the system prompts the caller to leave a Voice Mail message or provides a "busy" message and disconnects the call (action block 233). Test 235 is used to determine whether the caller selects Voice Mail. For example, the caller could key in a Y (i.e., 9 on the DTMF keyboard) to select Voice Mail and either key in an N (keyed 6) or simply hang up to disconnect the call. If the caller elects not to leave a Voice Mail message, then the caller disconnects (action block 237). If the caller elects to leave a Voice Mail message, then the caller is connected to the Voice Mail system and a record of the transaction number is recorded along with the Voice Mail message (action block 239). The caller then records a message (action block 241). Thereafter the call is disconnected (action block 243) and the Voice Mail system updates the host with a status message indicating that a message for a specified transaction number was left at a specified time. If no direct message link exists between the Voice Mail system or the switching system and the host, then the switching system can make a special record of the existence of the Voice Mail message along with the transaction number and time, and this message can be periodically sent to the preferred agent and/or a team supervisor, or to connect the preferred agent to the voice message automatically, after the preferred agent has logged on.

If some member of the preferred agent's team is logged on (positive result of test 231), then the caller is prompted to select between using another agent or leaving a Voice Mail message for the original agent or simply disconnecting. The caller can make the selection by keying one of two DTMF digits or letters. Test 253 is used to determine the caller's preference. If the caller chooses Voice Mail, then the actions, beginning with action block 239, previously described, are carried out. If the caller does not choose Voice Mail, then the call is routed to a queue for the identified agent's team (action block 255). Eventually, a call is established to a member of the identified agent's team (action block 257). The host transmits incomplete transaction data to that member's agent position (action block 259) and the member then requests additional transaction data from the caller (action block 261). The caller supplies the additional transaction data (action block 263). The transaction record is completed and sent to the host (action block 265). The entry in table 60 for that transaction number is cleared and the call is disconnected (action block 267).

Figure 6:
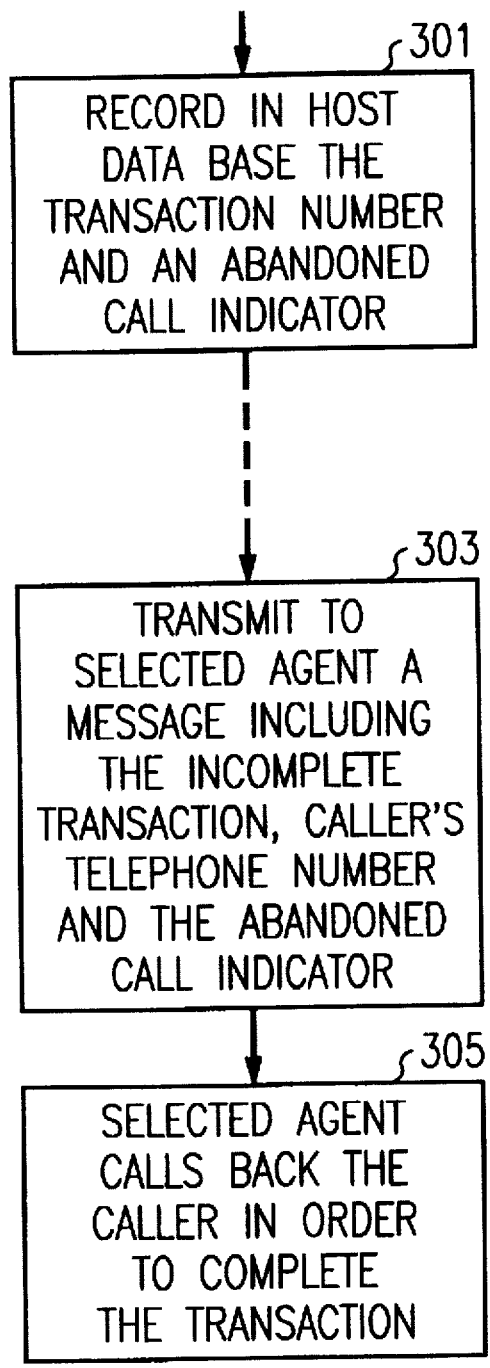

FIG. 6 is a flow diagram illustrating the processing of an abandoned call for the case in which a transaction number has been assigned. The transaction number and an abandoned call indication is recorded in the host data base (action block 301). Subsequently, a message is transmitted to the selected agent, the message including the incomplete transaction, the caller's telephone number, and the abandoned call indicator (action block 303). The selected agent then calls the caller back in order to try to complete the transaction (action block 305).

It is to be understood that the above description is only of one preferred embodiment of the invention. Numerous other arrangements may be devised by one skilled in the an without departing from the scope of the invention. The invention is thus limited only as defined in the accompanying claims.

I claim:

1. In an ACD (Automatic call distributor), a method of serving a second call for completing a transaction started by a caller in a first call, using an agent who had served said first call, comprising the steps of:

in said first call, providing said caller with a transaction number associated with said transaction;

storing said transaction number and an identification of said agent for said transaction;

subsequently, receiving said second call in said ACD;

receiving said transaction number from said caller;

identifying said agent from said transaction number; and completing said second call to said agent for completing said transaction.

2. The method of claim 2, wherein the providing step further comprises the step of providing said caller with a telephone number;

wherein the step receiving said second call comprises receiving said second call responsive to said caller dialing said telephone number;

wherein the step of receiving of said transaction number comprises the step of receiving said transaction number responsive to an initial prompt requesting said transaction number, said initial prompt being provided responsive to receiving said second call on said telephone number;

whereby second calls are immediately identified because they use said telephone number and callers or said second calls can then be immediately prompted for the transaction number.

3. In an ACD (automatic call distributor) a method of completing a call from a caller to an agent of said ACD for performing a transaction, comprising the steps of receiving a telephone number of said caller;

responsive to reception of said telephone number, determining an identity of a preferred agent for processing calls from said caller;

testing whether said preferred agent is available; and if said testing indicates that said preferred agent is available, completing said call to said preferred agent;

further comprising the steps;

said agent, determining that said transaction cannot be completed on the basis of information provided by said caller;

providing said caller with a transaction number associated with said transaction;

responsive to receipt of another call from said caller, prompting said caller to provide said transaction number, responsive to receiving said transaction number, identifying said preferred agent from said transaction number; and completing said another call to said preferred agent for completing said transaction.

4. A switching system for providing ACD (automatic call distributor) service, said switching system comprising;

processor means; and a switching network;

said switching network connectable to lines for agents providing said ACD service and to a public switched telephone network;

said processor means operative under program control for:

receiving a caller's telephone number from said public switched telephone network;

responsive to reception of said caller's telephone number, determining an identity of a preferred agent for processing calls from said caller;

testing whether said agent is available; and if said testing indicates that said preferred agent is available, completing said call to said preferred agent;

wherein said processor is further operative under program control for:

responsive to receipt of a subsequent call from said caller, prompting said caller to provide a transaction number for completing a transaction of said ACD service, said transaction number previously provided to said caller;

responsive to receiving said transaction number from said caller, identifying said preferred agent from said transaction number; and completing said subsequent call to said preferred agent for completing said transaction.

5. A switching system for providing ACD (automatic call distributor) service, said switching system comprising:

a switching network; and a processor;

said switching network connectable to a plurality of lines to a plurality of agent stations for providing said ACD service; and a public switched telephone network for carrying telephone calls to said ACD;

said processor operative under the control of a program for:

receiving a call in said switching system;

prompting a caller of said call to enter a transaction number;

responsive to receiving said transaction number, previously supplied to said caller for completing a transaction of said ACD service, from said caller, identifying a previously stored agent identification for processing a transaction characterized by said transaction number; and completing said call to said agent identified by said transaction number;

wherein said processor comprises storage for relating a transaction number to an identity of an agent preferred for completing said transaction.

* * * * *